UNITED STATES PATENT OFFICE.

RICHARD LÜDERS, OF HAMBURG, GERMANY.

PROCESS OF MAKING THE N-PROPYL ESTER OF P-AMINOBENZOIC ACID.

950,936.  Specification of Letters Patent.  Patented Mar. 1, 1910.

No Drawing.   Application filed January 27, 1909.  Serial No. 474,478.  (Specimens.)

*To all whom it may concern:*

Be it known that I, RICHARD LÜDERS, chemist, a subject of the German Emperor, and resident of Mühlenkamp No. 59, Hamburg, Germany, have invented a new and useful Process for the Manufacture of N-Propyl Ester of the P-Aminobenzoic Acid, of which the following is a specification.

Various esters of amino-benzoic acids are at present known, which, like the methyl and ethyl esters of the p-amino-benzoic acid and of the n-amino-p-oxybenzoic acid, have an anesthetic action.

It has been now found that by introducing n-propyl in place of methyl or ethyl into the carboxyl group of aminobenzoic acids, the anesthetic action of the esters is increased. This increased anesthetic action is more particularly to be found in the hitherto unknown n-propyl-ester of the p-aminobenzoic acid while the use of still higher aliphatic alcohols does not strengthen the anesthetic action, but on the contrary the higher molecular alkyl esters of the p-aminobenzoic acid have the disadvantage of being more poisonous. Nor is the anesthetic action in any way increased by the introduction of hydroaromatic or aromatic esters of such alcohols or phenols which in themselves have an anesthetic action, such as for instance menthol, guajacol, or thymol, into the molecule of the p-aminobenzoic acid.

The process for manufacturing p-aminobenzoic-acid-n-propyl ester is carried out in a manner similar to that for manufacturing methyl and ethyl esters of the p-aminobenzoic acid, that is to say, either by converting p-aminobenzoic acid into an ester by means of n-propyl alcohol, or by the treatment of p-nitrobenzoic acid-n-propyl ester with reducing agents.

*Examples.*

1. 5 parts by weight of n-propyl alcohol are boiled with 1 part of p-nitrobenzoic acid and 1 part of sulfuric acid or similar water absorbing means, until the complete conversion into ester takes place. The excess of alcohol is removed by distillation, the sulfuric acid neutralized by sodium carbonate or any similar alkaline agent, and the p-nitrobenzoic acid-n-propyl ester which is insoluble, separated. This ester has a melting point of about 35° C. after having been purified by recrystallization by means of alcohol. This hitherto unknown n-propyl ester of p-nitrobenzoic acid is very soluble in hot alcohol, very little soluble in cold alcohol, ether, benzol, chloroform and other organic solvents and forms crystals of the rhombic system. After separation this nitroester is reduced with tin and hydrochloric acid or other reducing means in the well known manner. If it is desired to use tin, 1 part of p-nitrobenzoic acid-n-propyl ester is boiled with 3 parts hydrochloric acid and 1 part tin until the complete reduction of the nitro group. After the reduction, soda is added until an alkaline reaction is obtained. The whole mass is then lixiviated with ether or benzol, which dissolves out the p-aminobenzoic-acid-n-propyl ester. The solution is then separated from the solid residue by filtration or decantation and then heated in a closed vessel, whereupon the ether or benzol vaporizes, leaving the slightly impure ester. This is then dissolved in ether and allowed to crystallize, the crystals being then redissolved in ether and allowed to crystallize again. This recrystallization is repeated until the ester is pure, at which time its melting point is about 73° or 74° C., and is in the form of needle crystals.

2. *Conversion into esters of the p-aminobenzoic acid with n-propyl alcohol.*—Either 1 part of the p-aminobenzoic acid is boiled with 5 parts of n-propyl alcohol in the presence of sulfuric acid, or dry hydrochloric acid gas is introduced into the mixture of p-aminobenzoic acid and n-propyl alcohol, until a large portion of the p-aminobenzoic acid has been converted into ester. After the reaction is completed, the sulfuric or hydrochloric acid is neutralized, and the excess of n-propyl alcohol removed by distillation. The residue is treated with diluted cold soda lye until the p-aminobenzoic acid that has not been converted into ester, is dissolved. The remaining ester is crystallized from benzol until it is pure.

The product obtained in the manner hereinbefore described, is the n-propyl ester of the p-aminobenzoic acid and, as proved by physiological comparative experiments, has a stronger anesthetic action than the p-aminobenzoic acid-ethyl ester (anesthesin) and the n-amino-p-oxybenzoic-methyl ester (new ortho form). It can easily be dissolved in benzol, alcohol and similar organic solvents, but is very little soluble in water.

The melting point of the n-propyl ester of the p-aminobenzoic acid is 73°–74° C., and it crystallizes in colorless rhombic prisms having the brilliancy of glass to mother of pearl.

The n-propyl ester of p-aminobenzoic acid is intended to be used for physiological purposes and for the manufacture of cosmetic, hygienic or therapeutical preparations.

The p-nitrobenzoic-n-propyl ester is formed by p-nitrobenzoic acid and n-propyl alcohol as follows:

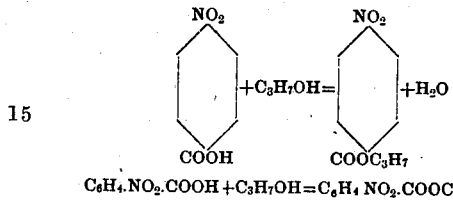

$C_6H_4.NO_2.COOH + C_3H_7OH = C_6H_4 NO_2.COOC_3H_7 + H_2O$.

The transformation of p-nitrobenzoic-n-propyl ester into p-amino-benzoic-n-propyl ester by means of hydrogen *in statu nascendi*, formed for instance by tin and hydrochloric acid is as follows:

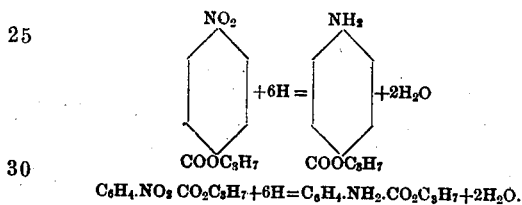

$C_6H_4.NO_2 CO_2C_3H_7 + 6H = C_6H_4.NH_2.CO_2C_3H_7 + 2H_2O$.

I claim:—

1. The herein described process, which consists in preparing p-nitrobenzoic-n-propyl ester, treating this ester with a nitro-reducing means, adding an alkaline agent, treating the mass with ether, and crystallizing out p-aminobenzoic-n-propyl ester, substantially as described.

2. The herein described process, which consists in boiling 5 parts of n-propyl alcohol with 1 part of p-nitrobenzoic acid and 1 part sulfuric acid, removing the excess of alcohol, neutralizing the sulfuric acid, separating from the resultant mass p-nitrobenzoic-n-propyl ester, boiling said ester with 1 part of tin and 3 parts of hydrochloric acid, adding an alkaline agent, lixiviating the resultant mass with ether, and crystallizing out from the ether solution p-aminobenzoic-n-propyl ester, substantially as described.

3. The herein described p-aminobenzoic-n-propyl ester, crystallizing in colorless rhombic crystals, soluble in benzol and alcohol, almost insoluble in water, melting at 73°–74° C., and having strong anesthetic properties, substantially as described.

In testimony, that I claim the foregoing as my invention, I have signed my name in presence of two witnesses, this ninth day of January 1909.

RICHARD LÜDERS.

Witnesses:
  FRANZ O. FRITZSCHE,
  JOHANNES F. SUHR.